Dec. 30, 1969  E. C. BETZ  3,486,841
HEAT RECOVERY SYSTEM FOR DRYING OVENS
Filed Aug. 11, 1967
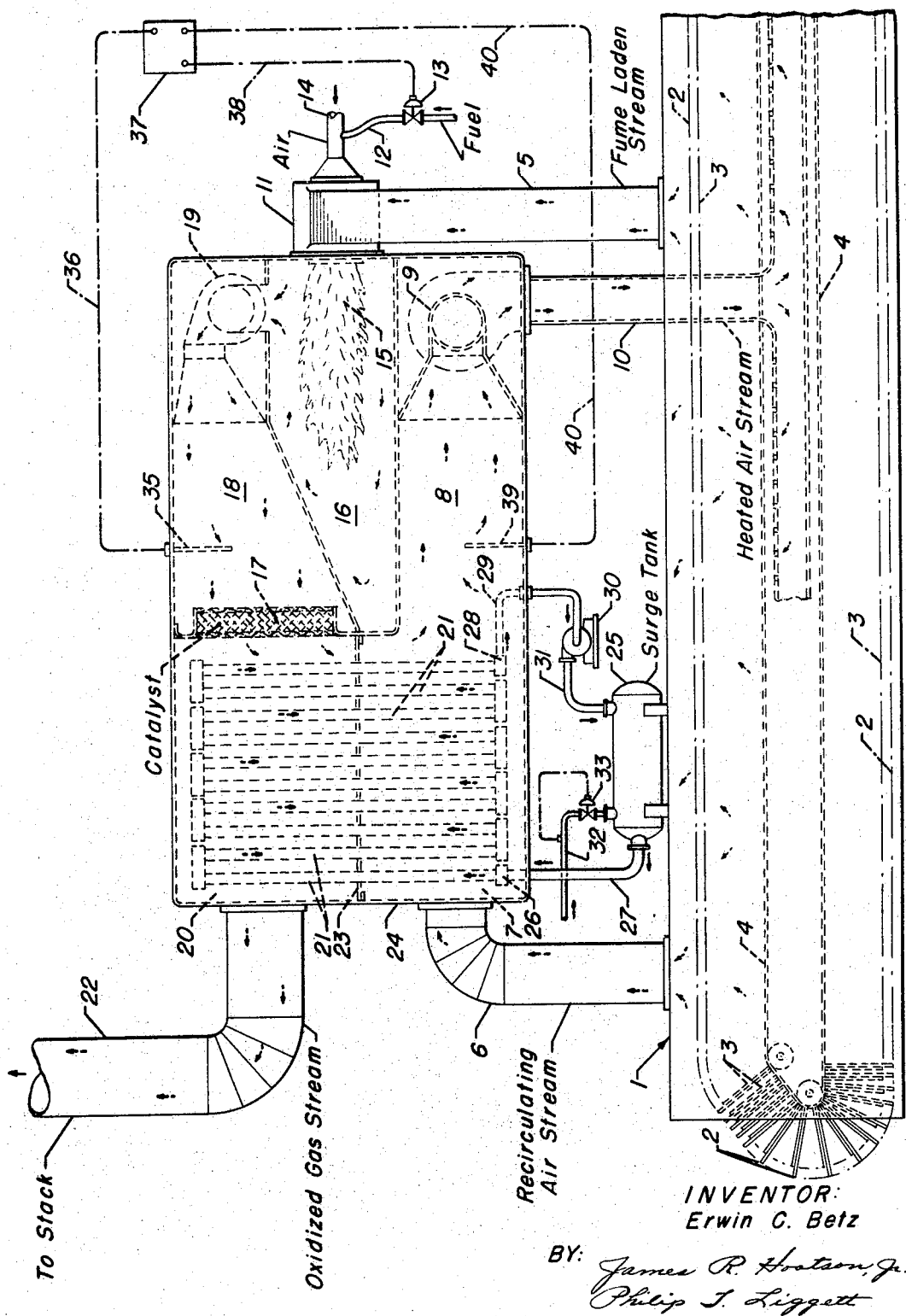
INVENTOR:
Erwin C. Betz
BY: James R. Hoolson, Jr.
Philip J. Liggett
ATTORNEYS

United States Patent Office 3,486,841
Patented Dec. 30, 1969

3,486,841
HEAT RECOVERY SYSTEM FOR DRYING OVENS
Erwin Carl Betz, Gondsroth, Germany, assignor to Universal Oil Products Company, Des Plaines, Ill., a corporation of Delaware
Filed Aug. 11, 1967, Ser. No. 660,128
Int. Cl. B01t 9/02
U.S. Cl. 23—2
7 Claims

ABSTRACT OF THE DISCLOSURE

A liquid heat transfer medium is used in a closed and pressured heat exchanger section of a heat recovery system for integration with catalytic oxidation of an oven discharge stream in order to provide a form of "heat-sink" and a more uniform heat release to a circulating gaseous stream. The system is of particular advantage for use with a discharge stream having a cyclical release (or varying quantity) of oxidizable volatile materials.

SPECIFICATION

The present invention relates to a heat recovery system for use with hot gaseous streams and more particularly to a system adapted to obtain useful heat from operations which have a cyclical release of heat energy in the waste gas stream.

It is quite customary to effect either thermal or catalytic incineration of fume laden waste gas streams prior to their discharge into the atmosphere. For example, in connection with ovens used for the drying of protective lacquer coatings on containers, metal sheets, etc., there is a high production of vaporized solvents which, if allowed to escape to the atmosphere, would cause a high degree of contamination in the area of the drying oven. In effecting a catalytic incineration of the combustible fumes there is a release of useful heat energy which, of course, should be recovered where possible.

It should be pointed out that in adopting the insurance underwriter requirements for reducing the fire hazard by diluting volatiles in the air stream, to one-fourth of the Lower Explosive Limit (LEL) of the particular type of vapor, there is a substantial waste of potential energy. For example, an oven vented to provide a 25% LEL carries away energy that is capable of raising its own temperature approximately 660° F., based upon the fact that the B.t.u. release in a cubic foot of dry air (at standard 70° F. density) will raise its temperature approximately 55° F. and that there are 12 B.t.u.'s per standard cubic foot in the diluted air stream. It is thus of definite advantage to do away with dilution and to provide, in accordance with the present invention, a drying oven or heat treating apparatus which will oxidize through catalytic action the volatiles in the fume laden air and make available, in a recovery system, the heat from such oxidation to heat the air stream being introduced into the drying zone or zones. The heat available from such oxidation will normally be adequate to supply the total heat requirements of the oven, with auxiliary heat being used primarily for startup purposes. The use of catalytic incineration of course provides means for rapidly reducing, by oxidation, the solvent loading in the vent gas stream to eliminate odor and fire hazard.

Generally, the hot combustion gases from the fume oxidation zone are passed through an air to air type heat exchanger or, at least in part, recirculated to the oven or treating zone from which they come such that there is some recovery of the energy from the products of combustion. However, where there is a cyclical release of fumes and vapors from a particular oven or treating system there is the disadvantage of an accompanying cyclical temperature pattern to the heat exchanger unit and thus to the recirculating stream.

SUMMARY OF THE INVENTION

It may be considered a principal object of the present invention to provide a liquid heat transfer medium, in the manner of a "heat-sink," in a closed and pressured heat exchange system to accommodate a cyclic type of discharge stream to in turn effect a more uniform or stable heat release to a circulating stream.

It is also an object of the present invention to provide an adjustable burner means or other heat supply means in combination with the fume laden exhaust gas stream such that controlled preheating may be given to such stream ahead of the catalytic oxidizing zone and the heat transfer section of the system.

A still further object of the present invention is to incorporate control means into the catalytic vapor oxidizing and liquid heat transfer system such that heat requirements at both the catalytic oxidizing zone and the heat transfer zone can provide for a regulation of an adjustable preheat supply means to give a uniform heat release in the system.

In a broad aspect, the present invention provide a method for effecting heat recovery with substantially uniform heat transfer to a recirculation stream, where there is heat available from the catalytic combustion of noxious oxidizable components in a vapor laden gaseous stream and which stream has a varying quantity of oxidizable components, which comprises, passing the laden exhaust stream at a conversion temperature into contact with an oxidizing catalyst and then passing the resulting hot oxidized exhaust gas stream into a heating zone and into indirect exchange relationship with a moving liquid heat transfer medium, circulating the latter in a closed heat exchange circuit under a predetermined superatmospheric pressure to a heat release zone, at the same time passing said heat transfer medium in indirect heat exchange relationship with a recirculating stream to impart heat transfer thereto, and withdrawing a resulting desired uniformly heated recirculating stream from said heat release zone as a heat recovery step.

In a preferred operation, a stable heat transfer medium, such as Dowtherm, is employed as the heat energy conveying medium. As is generally known, Dowtherm is a relatively stable liquid heat retaining medium comprising a mixture of diphenyl and diphenyloxide. This material is particularly useful in the 400° F. to 750° F. field for indirect heating operations. Also, by keeping the heat transfer medium under a given preset pressure, which may be determined to suit a particular heat exchange operation, the temperature of the circulating medium may be kept substantially constant regardless of the temperature passing through the heating section of the circulating system. It is, of course, necessary that there be a suitable surge drum for the Dowtherm system, pump means to maintain the constant circulation, and adjustable pressure control means to effect the maintenance of the desired predetermined pressure on the system. For high temperature situations, the Dowtherm reservoir or surge tank and circulating system is kept under pressure by nitrogen, carbon dioxide or other suitable inert gaseous metal.

Also, in a preferred embodiment of the invention, suitable adjustable heat supply means is incorporated into the exhaust gas incineration portion of the flow system so as to insure adequate temperature within the exhaust gas stream itself for ignition of catalytic combustion within the catalyst bed of the unit. Generally, catalytic oxidation will take place in a highly active all metal catalyst zone at a temperature within the 600° F. range, however, higher temperatures may be required. The catalyst may be of the pill or pellet type held in a permeable packed bed such that the exhaust gas stream may pass therethrough and effect an efficient contact with the surface of the catalyst particles. Such catalyst particles may comprise, for example, alumina or silica-alumina spheres, and the like, in the 1/16" to 3/16" size range, as a base material that is in turn impregnated with platinum or a platinum group metal in order to produce a highly active oxidizable catalytic material. It is, however, not intended to limit the present invention to any one type of catalytic material inasmuch as there are many types of well-known oxidation catalysts and oxidizing components which may comprise non-noble metals such as those under Group VIII, V-A and VI-A of the Periodic Table. In fume oxidation processes, where there are no entrained particulates, it is also of particular advantage to use an all-metal type of catalyst such as disclosed within Sutter et al U.S. Patent No. 2,720,494. The latter teaches the use of a platinum group metal plated or otherwise coated to a heat resistant chrome-nickel alloy ribbon type of material.

In still another aspect, a preferred system utilizes suitable temperature sensitive means and control means in combination with an adjustable heat supply means, whereby a variation in temperature in the stream being heated by the heat transfer medium will cause an accompanying change at the preheat burner means and in turn provide a desired greater or lesser quantity of heat input within the heating section of the circulating heat transfer medium. In other words, the control means will be such that the temperature sensitive means in the heat transfer section will over-ride the requirements of the temperature sensitive control means at the catalytic conversion zone so that an insufficient quantity of heat in the heat release section, or in the heating section of the system immediately downstream from the catalyst zone, will adjust the preheat burner means in a manner to maintain a desired uniform heat output from the system. In other words, the heat of combustion of the adjustable preheat supply means will make for any heat demand that the circulating system might require in the event that the heat of combustion from the catalyst conversion zone be insufficient.

Reference to the accompanying drawing and the following description thereof will serve to illustrate one embodiment of the present improved heat recovery system as used in combination with the catalytic oxidation and purification of an exhaust gas stream, as well as point out additional advantageous features which may be utilized in an integrated system to obtain uniform heat transfer to a recirculation stream.

DESCRIPTION OF THE DRAWING

Referring now particularly to the drawing, there is shown diagrammatically a portion of a heat treating apparatus, such as an elongated oven chamber 1 adapted to have moving currents of heat air pass over coated items which are continuously carried through the oven unit. For example, a multiplicity of small coated sheets or other articles 2 may be carried by wickets 3 along a suitable trackway or conveyor belt means 4 which in turn moves continuously through the oven unit 1 by means of suitable pulley means and roller means of a conventional type and not fully shown within the present drawing.

As is customary with most treating oven units, there is a continuous withdrawal of a fume laden exhaust stream, such as by means of duct 5, while at the same time additional heated air, or heated recirculated air, is continuously introduced into the drying oven or treating zone. In the present drawing a recirculating, heat recovering air stream is shown as being withdrawn by way of duct means 6, passed into a heat transfer zone 7 and then returned by way of plenum 8, fan means 9, and duct means 10 into the body of the oven. The redistribution of the heated air stream into the oven 1 from duct 10 may be carried out in any conventional manner.

In order that the vapor laden exhaust gas stream in duct 5 be purified prior to discharge to the atmosphere, it is, of course, necessary to have an adequate quantity of oxidizing catalyst in the catalytic conversion zone of the system so as to remove all of the objectionable combustible vapors and noxious odors. The nature of the combustible vapors, evaporated solvents, or whatever, can vary depending upon the type of treating or drying operation being carried out within the oven unit 1; however, it may be noted that heat treating ovens frequently operate at speeds accommodating more than 100 coated sheets per minute such that the amount of solvent evaporated in the drying process may be as much as 150 gallons per hour or more.

In a catalytic treating section utilizing platinum or other active platinum group metal, it is, of course, necessary that there be adequate conversion temperature at the catalyst zone and such temperature is generally of the order of 500° F. or more preferably at about 700° F. to insure rapid ignition and activation of the catalyst bed. With less active catalytic materials the ignition temperature required may be of the order of 900° to 1000° F. The present embodiment illustrates a "scroll-type" heater unit 11 receiving fuel by way of line 12, having an adjustable control valve means 13, and an adequate air supply by way of line 14. In the scroll type burner unit, the laden exhaust gas stream is introduced centrifugally around an axially positioned burner nozzle receiving the fuel-air mixture such that there is a resulting high speed centrifugal mixing between the laden exhaust gas stream and the fuel-air mixture to provide a relatively short, thick, high intensity flame, indicated as 15 within a burning zone 16. The flame 15 will of course effect some degree of thermal incineration of the entrained combustion materials; however, in the present system, the adjustable burner means 11 effects primarily a preheating of the entire stream being withdrawn by way of duct 5 so as to insure an adequate conversion temperature for contact with catalyst bed 17 maintained at the end of conversion zone 18. Suitable fan means 19 is shown between heating zone 16 and conversion zone 18 in order to maintain a uniform continuous movement of the laden exhaust gas stream through the catalyst bed 17 and into an adjacent heating section 20.

In the heating section 20, there is an indirect heat exchange relationship with a multiplicity of tubular means 21 carrying liquid Dowtherm, or other suitable heat transfer medium, whereby to effect a heat recovery from the hot oxidized gas stream leaving bed 17. The resulting partially cooled gas stream, free of combustible vapors and noxious odors, is then passed on from heat exchange zone 20, by way of duct 22, to a suitable discharge stack, not shown.

In the present embodiment, there is indicated a partitioning means 23 within the unitary housing or chamber 24 liquid carrying heat transfer tubes 21 extending between said heating chamber 20 and the confined heat release section 7. It is not intended to limit the present invention to any one type of tubular arrangement or to any special type of heat exchanger inasmuch as various gas flow patterns and arrangements for tubes may be utilized to effect the transfer of a heat from zone 20 into zone 7 through a heat stable, heat retaining medium. Further, where desired, suitable finned type tubular means may be used to enhance the heat transfer between the gaseous flow stream and the tubular liquid flow.

Again, referring to the drawing of the present system, there is indicated diagrammatically a heating medium surge tank 25 connecting with inlet tube means 26 by way of line 27, while the circulated liquid outlet means 28 connects to line 29 and pump 30. The latter discharges into tank 25 by way of line 31 and is utilized to maintain a forced liquid circulation in the heat exchanger section of the system. Suitable pressure is also maintained on the system by way of gas pressure from line 32 and control valve 33, whereby the entire heat transfer circuit will be operating in the liquid state, rather than in a vapor state, and a maximum temperature thus provided for in the circulating Dowtherm or other heat transfer liquid.

Generally in a catalytic purification step for a vapor laden exhaust gas stream, there will be a substantial temperature rise in the exhaust gas stream leaving the catalyst zone and, in this case, the stream entering the heating zone 20 may have temperatures of the order of 850° to 1000° F. The heat retaining fluid medium circulated within the tubular heat exchange system may be maintained at a level of the order of 650° F. to 700° F., depending upon the temperature within zone 20. However, as pointed out hereinbefore, it is the particular advantage of the present system to be able to obtain a "heat-sink" type of operation in the utilization of the liquid heat exchange medium, which in turn is maintained under a preset pressure. In other words, with a constant circulation of the Dowtherm liquid by pumping means 30 through the heat exchange tubes, there can be obtained a maximum boiling temperature, which can, for example, be of the order of 700° F. at about 96 pounds per square inch gauge, obtained from the varying temperature stream leaving catalyst zone 17 and entering heating section 20. With the preset pressured heat exchange system, the Dowtherm, or other heating medium, will reach a maximum temperature in accordance with preset pressure and any additional heat energy available within heating zone 20 will necessarily pass on through such zone without being absorbed by the boiling heat transfer medium. In this manner, substantially uniform temperatures are constantly circulated into the heat release zone 7 for transfer to the recirculating air stream entering from conduit 6 and returning to the oven unit 1 by way of conduit means 10. Generally, the recirculating air stream for most drying oven operations will be at least of the order of about 500° F. so that the heat exchange surface as provided by the tubular means 21 must necessarily be sufficient to provide the air stream in duct means 6 with the desired rise in temperature.

In order to obtain adequate control over the entire fume oxidation step and the accompanying heat exchange system so as to obtain a uniform transfer of heat energy into the recirculating air stream there is an automatic control arrangement for the burn means 11 through fuel supply valve 13. In other words, in one arrangement or embodiment, there is a temperature sensitive means 35 connective with the catalytic oxidation zone 18 at a point upstream from the catalyst bed 17 whereby to insure an adequate catalytic conversion temperature in such zone. Temperature sensitive means 35 connects through line 36 to controller 37 which in turn connects through line 38 to valve means 13 whereby an increased or decreased flame at 15 will effect the desired accompanying increasing or decreasing of preheat temperature to zone 18.

In addition to the temperature control for the catalytic oxidation section, a preferred method of operation utilizes temperature sensitive means, such as 39, within the heated air zone 8 and provides for its connection to control means 37 through line 40, whereby there may be continuous monitoring of the recirculated air temperature. Controller 37, or other automatic control means, shall be capable of providing an over-ride effect with respect to the temperature sensitive means 35 in zone 18 such that fuel to burner 11 will be increased or decreased as may be necessary to maintain a desired uniform temperature in the resulting heat exchange at zone 8. In other words, in the event that the temperature within zone 20 by virtue of a low cyclic supply of volatile combustible materials entering oxidation zone 18 may permit a lowering of temperature in the heat release zone 7 to in turn show an insufficient temperature at means 39 in zone 8, then heat can be called for in the overall system through burner 11 transferring heat into preheat zone 16. The resulting higher temperature exhaust gas stream from zone 16 will then carry on into catalyst zone 18 at a temperature elevated over that which may be necessary for normal ignition of a catalytic oxidation step. However, the increased temperature will supply the additional heat capacity for maintaining a uniform temperature in the Dowtherm or other circulating liquid heat exchange medium for tubes 21. The maintenance of a desired temperature within the circulating heat transfer medium will in turn insure the uniform temperature to the recirculating air stream reaching zone 8. It will thus be seen that the present overall system maintains a desired uniform temperature on the return air stream in zone 8, either by suitable heat release from entrained volatiles and their catalytic combustion in zone 17 or by the utilization of additional heat release in burner means 11 at preheat zone 16.

Again, it is to be pointed out that the present apparatus arrangement shown in the improved heat transfer system is diagrammatic and that the invention shall not be limited to the scope of the one apparatus embodiment indicated in the drawing. For example, other types of burner means may be utilized, rather than the contrifugal scroll type burner 11. Also, other physical or mechanical arrangements can be utilized in effecting the transfer of the adjustably heated exhaust gas stream from the preheat zone to the oxidation zone. Still other arrangements may be utilized in effecting the contact of the exhaust gas stream with the catalytic surface of the bed in zone 17. In fact, where other than a mat type all-metal form of catalyst is used, it may be of advantage to have a substantially horizontal gas permeable form of bed such that pills, pellets, or other particulated material, may be better accommodated with a minimization of crushing or settling problems.

Still further, many arrangements may be provided in effecting the transfer of a liquid heat retaining medium between a heating zone and a heat release zone, as well as alternatives utilized in the design and positioning of liquid reservoir or surge tank means. While Dowtherm appears to provide a preferred heat retaining medium for the temperature conditions involved in a drying oven operation, because of its stability and general noncorrosive effects, it is, of course, within the scope of the present invention to utilize other equivalent types of mediums or oils. For example, an oil such as "Mobiletherm," or a fused salt, such as sodium nitrate, might well be used for certain operations.

I claim as my invention:

1. A method for effecting heat recovery with substantially uniform heat transfer to a recirculatory stream, where there is heat resulting from the catalytic combustion of noxious oxidizable components in a vapor laden gaseous exhaust stream and where the laden exhaust stream has a varying quantity of oxidizable components, which comprises passing the laden exhaust stream at a conversion temperature into contact with an oxidizing catalyst and passing the resulting hot oxidized exhaust gas stream into a heating zone and into indirect heat exchange relationship with a moving liquid heat transfer medium, circulating the latter in a closed heat exchange system under a predetermined superatmospheric pressure to a heat release zone, at the same time passing said heat transfer medium in indirect heat exchange relationship with a recirculating stream to impart heat transfer thereto and withdrawing a resulting desired uniformly heated recirculating stream from said heat release zone as a heat recovery step.

2. The method of claim 1 further characterized in that a temperature sensitive means communicates with the path of the exhaust gas stream to said catalytic conversion zone and adjustable heat supply means is positioned upstream of such zone in direct communication with such path, with said temperature sensitive means connecting with control means in turn connective with the adjustable heat supply means whereby there may be adjustment of the latter to directly increase or decrease heat responsive to a lowering or increasing temperature noted by said temperature sensitive means.

3. The method of claim 2 still further characterized in that additional temperature sensitive means connects with said recirculating air stream downstream from the heat release zone and is connective with the adjustable heat supply means whereby to effect adjustment of the latter directly responsive to decreases and increases from a predetermined temperature level being maintained within said heat release zone whereby to increase the heat output at said heat supply zone responsive to a lowering of temperature in the heat release zone and effect a decrease heat release at the heat supply zone responsive to an increase in temperature in the heat release zone.

4. A heat recovery system for use with the catalytic combustion of vapors in a waste gas stream, which comprises in combination, a first passageway means for conducting a volatiles laden gaseous stream to an oxidizing catalyst section, a pervious catalyst bed positioned across the latter section to provide for the catalytic oxidation of combustible fumes carried in said waste gas stream, adjustable heat supply means connecting to said first passageway means for preheating said stream passing therethrough, a heating section connecting to and positioned downstream from said catalyst section with such heating section in turn containing a portion of a closed heat exchange system accommodating a liquid heat transfer medium, an oxidized gas outlet conduit from said heating section, a separate heat release section adjacent said heating section and containing a portion of said closed liquid containing heat exchanger system, additional gas passageway means connecting with said heat release section to conduct a gaseous stream to be heated by said heat exchanger system into and from said heating section, and pumping means connective with said heat exchanger section effecting the circulation of a heat stable liquid medium therein.

5. The system of claim 4 further characterized in that a liquid reservoir section is provided in direct connection with said closed liquid containing heat exchanger system and a valved gas inlet means connects thereto whereby a pre-set superatmospheric pressure may be maintained on said heat exchanger system with an inert gaseous medium.

6. The system of claim 4 further characterized in that a controller means connects with said adjustable heat supply means and temperature sensitive indicating means connects with said catalyst section and with said control means whereby the heat supply means may be adjusted responsive to heat requirements within the catalyst section.

7. The system of claim 6 still further characterized in that additional temperature sensitive means is provided in said heat release section and is connective with said controller to said adjustable heat supply means whereby the latter may be adjusted directly responsive to heat requirements in said heat release section to maintain a substantially uniform temperature therein.

References Cited

UNITED STATES PATENTS

| | | | |
|---|---|---|---|
| 2,795,054 | 6/1967 | Bowen | 34—35 |
| 2,905,523 | 9/1959 | Houdry et al. | 23—2 |
| 3,090,675 | 5/1963 | Ruff et al. | 23—277 |
| 3,311,456 | 3/1967 | Denny et al. | 23—2 X |
| 3,395,972 | 8/1968 | Hardison | 23—2 X |

OSCAR R. VERTIZ, Primary Examiner

E. C. THOMAS, Assistant Examiner

U.S. Cl. X.R.

23—288; 34—35.68